US005587547A

United States Patent [19]

Nakai et al.

[11] Patent Number: 5,587,547

[45] Date of Patent: Dec. 24, 1996

[54] MUSICAL SOUND PRODUCING DEVICE WITH PITCH CHANGE CIRCUIT FOR CHANGING ONLY PITCH VARIABLE DATA OF PITCH VARIABLE/INVARIABLE DATA

[75] Inventors: Toshiki Nakai; Mitsuyoshi Amano; Kazuhiro Miyamoto; Yoshiyuki Akiba; Masuhiro Sato, all of Tokyo-to, Japan

[73] Assignee: Pioneer Electronic Corporation, Tokyo, Japan

[21] Appl. No.: 273,490

[22] Filed: Jul. 11, 1994

[30] Foreign Application Priority Data

Jul. 14, 1993 [JP] Japan .................................... 5-173856

[51] Int. Cl.$^6$ .............................. G09B 15/02; G10H 7/00

[52] U.S. Cl. ............................................ 84/645; 84/477 R

[58] Field of Search .................................. 84/645, 477 R, 84/478, 615–620, 653–658

[56] References Cited

U.S. PATENT DOCUMENTS

| | | | |
|---|---|---|---|
| 5,281,754 | 1/1994 | Farrett et al. | 84/645 X |
| 5,295,123 | 3/1994 | Seri et al. | 84/645 X |
| 5,357,048 | 10/1994 | Sgroi | 84/645 |

*Primary Examiner*—Stanley J. Witkowski
*Attorney, Agent, or Firm*—Kane, Dalsimer, Sullivan, Kurucz, Levy, Eisele and Richard, LLP

[57] ABSTRACT

A musical sound producing device produces musical sound from MIDI data. The MIDI data includes play data for producing musical sound of plurality of tones, pitch data for designating pitch of the musical sound and pitch variable/invariable data indicating pitch variable tones and pitch invariable tones. The device includes: MIDI sound source for producing musical sound of tones designated by the play data with pitch designated by the pitch data; and pitch change circuit for changing the pitch data of only pitch variable tones specified by the pitch variable/invariable data in accordance with pitch change information.

7 Claims, 13 Drawing Sheets

FIG. 7

| No | TRACK TYPE | CODE (nh) | NOTE TRACK | VAR-IABLE | INVAR-IABLE |
|---|---|---|---|---|---|
| 1 | CONDUCTOR TR. | 11h | | | |
| 2 | Ex DATA TR. | 10h | | | |
| 3 | NORMAL NOTE TR. | 00h | ○ | ○ | |
| 4 | RHYTHM TR. | 01h | ○ | | ○ |
| 5 | KEY-CONT. INVARIABLE TR. | 02h | ○ | | ○ |
| 6 | MELODY TR. | 03h | ○ | ○ | |
| 7 | BASS TR. | 04h | ○ | ○ | |
| 8 | BACKING PART TR. | 05h | ○ | ○ | |
| 9 | NO-MUTE TR. | 07h | ○ | ○ | |
| 10 | CODE TR. | 08h | ○ | ○ | |
| 11 | PROGRAM CHANGE TR. | 09h | | | |
| 12 | VOCAL EFFECT TR. | 0Ah | | | |
| 13 | DRUM LOW-PITCH SOUND TR. | 21h | ○ | | ○ |
| 14 | BASS LOW-PITCH SOUND TR. | 24h | ○ | ○ | |

FIG. 9

| NOTE | FILE DATA | READING TIME |
|---|---|---|
| $D_1$ | [90 60 59] | $t_0$ |
| $D_2$ | [91 62 61] | $t_0$ |
| $D_3$ | [92 65 69] | $t_0$ |
| $D_4$ | [80 60 59] | $t_1$ |
| $D_5$ | [81 62 61] | $t_2$ |
| $D_6$ | [93 63 70] | $t_3$ |
| $D_7$ | [82 65 69] | $t_4$ |
| $D_8$ | [94 66 73] | $t_5$ |
| $D_9$ | [83 63 70] | $t_6$ |

MUSICAL SOUND PRODUCING DEVICE WITH PITCH CHANGE CIRCUIT FOR CHANGING ONLY PITCH VARIABLE DATA OF PITCH VARIABLE/INVARIABLE DATA

BACKGROUND OF THE INVENTION

1. Field of the Invention

This invention relates to musical sound producing device, and more particularly to musical sound producing device which changes data represented by MIDI signal to be supplied to MIDI sound sources and produces musical sound with pitches arbitrarily changed.

2. Description of the Prior Art

There is known MIDI (Musical Instrument Digital Interface) standard established for exchanging information between musical instruments such as synthesizer or electronic piano connected with each other. Electronic instruments provided with hardware according to MIDI standard and having functions of transmitting and receiving MIDI signal, serving as musical instruments control signal, are generally called as "MIDI equipments".

A MIDI signal supplied to MIDI equipment is serial data of transfer rate 31.25 [Kbaud]. One byte data of MIDI signal consists of 10 bits data including 8 bits for data, 1 bit for start bit and 1 bit for stop bit. Further, at least one status byte for indicating kinds of transferred data and MIDI channels and one or two data bytes introduced by the status byte are combined to form a message serving as musical information. Accordingly, one message generally consists of 1 to 3 bytes, and transfer time of one message ranges from 320 to 960 [μsec]. These series of the messages constitutes musical instrument playing program. Some messages consist of only status byte or more than 3 bytes.

Constitution of note-on message and note-off message, included in channel voice message, will be described with reference to FIGS. 1A and 1B, as an example. In FIGS. 1A, the note-on message in the status byte 1 corresponds to operation of depressing a key of keyboard, for example, and the note-off message in the status byte 2 corresponds to operation of releasing the depressed key of keyboard. As shown in FIG. 2, note-on message and note-off message are generally used in pair with each other. Note-on message is expressed by "9h" (h:hexadecimal digit), and note-off message is expressed by "8h". Channel designates one of sixteen tones assigned to "0h–Fh". Note number in the data byte 1 indicates pitch, and designates one of 128 stages (0h–7Fh) of pitches which are assigned to 88 keys of piano in a manner that the center key of 88-key piano corresponds to the center of the 128 stages (0h–7Fh) of pitches. Velocity in data byte 2 designates one of 128 stages of intensity of sound (volume). Note-off message may be replaced with note-on message of the same channel and having velocity value of zero. According to the data format described above, MIDI equipment produces sound of designated pitch with designated volume. For example, when the messages shown in FIG. 1B are supplied, MIDI equipment outputs sound of tone designated by the channel data "0" with pitch designated by the note number "60" and intensity (volume) designated by the velocity data "65". The status byte 2 (indicating "80") subsequent thereto instructs terminating output of sound of tone "60" with volume "65". Therefore, if MIDI sound source module, amplifier and speaker are connected as shown in FIG. 3, MIDI equipment can produce desired musical sound, like electronic instruments.

In connection with music play by MIDI equipments, there is known pitch control device (key control device). Pitch control device changes note number value, set in note-on message of MIDI signal serving as instruments play program, by a change value (e.g., "1") and supplies MIDI signal of transposed songs to MIDI equipments. For example, when the messages shown in FIG. 1B are supplied, pitch control device changes the note number from "60" to "61", in response to key change instruction from user, and supplies the MIDI signal thus modified to MIDI equipments so as to reproduce transposed music songs. By applying such a device to karaoke system, pitch of accompaniment may be modified to adapt to key of singer. A pitch control device of this kind is described in Japanese Patent Application No. 02-147976.

However, pitch control device described above changes pitch for all tones uniformly, in response to user's key change instruction. Therefore, tone quality of some instruments may changed unnaturally. Particularly, pitch is uniformly changed to tones that do not require changes, such as rhythm instruments like drum, hand clapping in karaoke songs or sound effect like sound of falling rain. Therefore, transposition by such device gives unnatural feelings to user, compared with transposition in live performance.

SUMMARY OF THE INVENTION

It is an object of the present invention to provide musical sound producing device capable of natural pitch control, in play of MIDI equipment, adapted to each instruments or playing parts of musical sound.

According to one aspect of the present invention, there is provided a musical sound producing device for producing musical sound from MIDI data. The MIDI data includes play data for producing musical sound of plurality of tones, pitch data for designating pitch of the musical sound and pitch variable/invariable data indicating pitch variable tones and pitch invariable tones. The musical sound producing device includes: MIDI sound source for producing musical sound of tones designated by the play data with pitch designated by the pitch data; and pitch change unit for changing the pitch data of only pitch variable tones specified by the pitch variable/invariable data in accordance with pitch change information.

As described above, according to the present invention, the pitch change unit refers to pitch variable/invariable data, stored in MIDI data, for discriminating pitch variable tones and pitch invariable tones, and executes pitch change operation only to data of pitch variable tones. Therefore, unnatural variation in sound quality of tone which needs no pitch change is avoided, and natural transposition like live performance can be achieved.

BRIEF DESCRIPTION OF THE DRAWINGS

FIG. 7 is a diagram illustrating contents of each tracks in note-file;

FIG. 9 is a diagram illustrating examples of note-file data;

DESCRIPTION OF THE PREFERRED EMBODIMENT

A preferred embodiment of the present invention will be described below with reference to the accompanying drawings.

Figure 4:
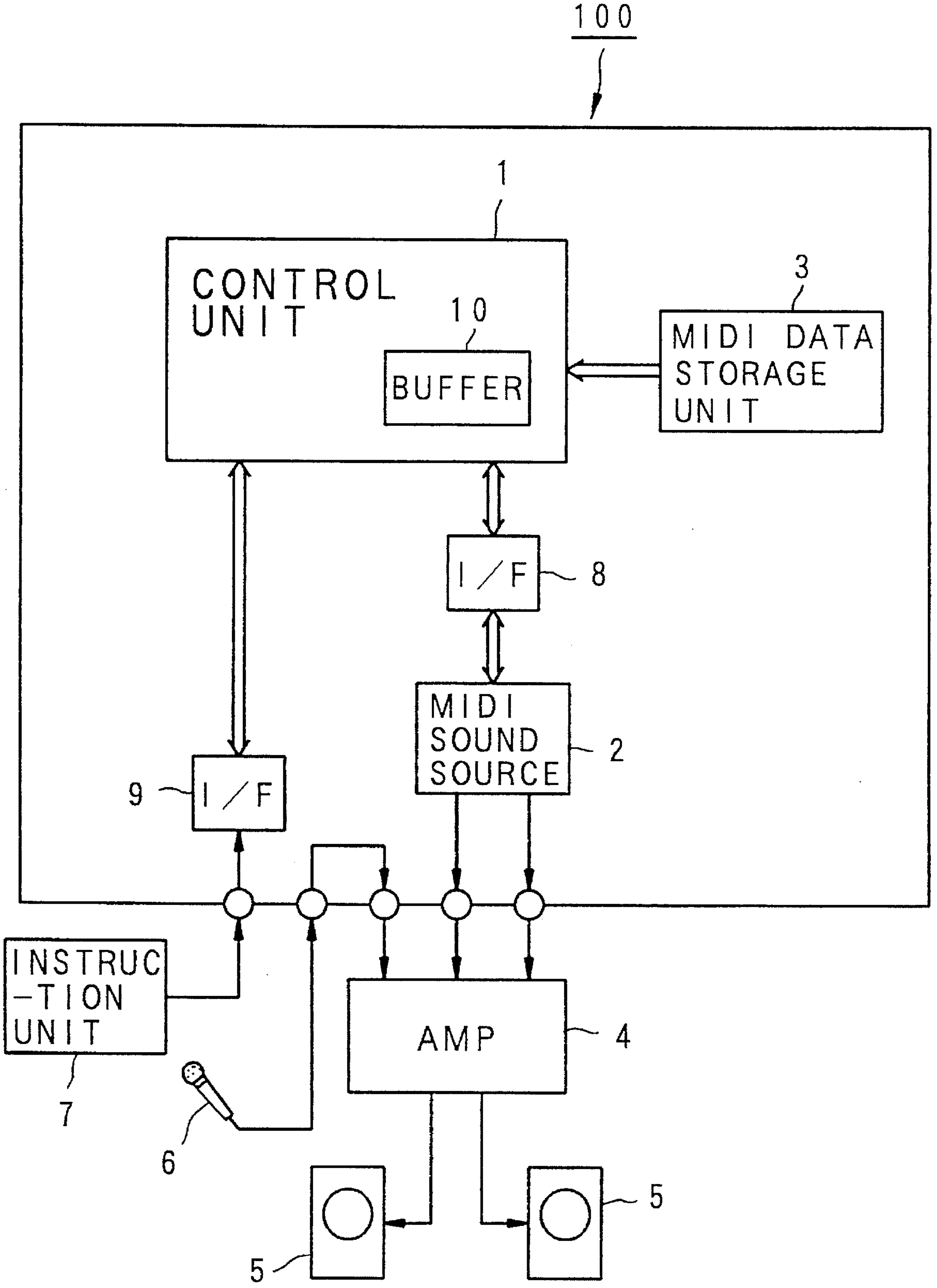
FIG. 4 is a diagram illustrating construction of MIDI karaoke apparatus according to an embodiment of the present invention.

FIG. 4 illustrates a construction of MIDI karaoke apparatus according to an embodiment of the present invention. MIDI karaoke apparatus 100 includes a control unit 1, a MIDI sound source 2, a MIDI data storage unit 3, an amplifier 4, a pair of speakers 5, a microphone 6, an instruction unit 7 and interfaces 8 and 9. The control unit 1 includes a buffer 10 for storing note-on data. Accompaniment music with which singer sings karaoke songs are stored in the MIDI data storage unit 3 in a form of MIDI data. MIDI data is read out by the control unit 1 and is transmitted to the MIDI sound source 2 via the interface 8.

Figure 5:
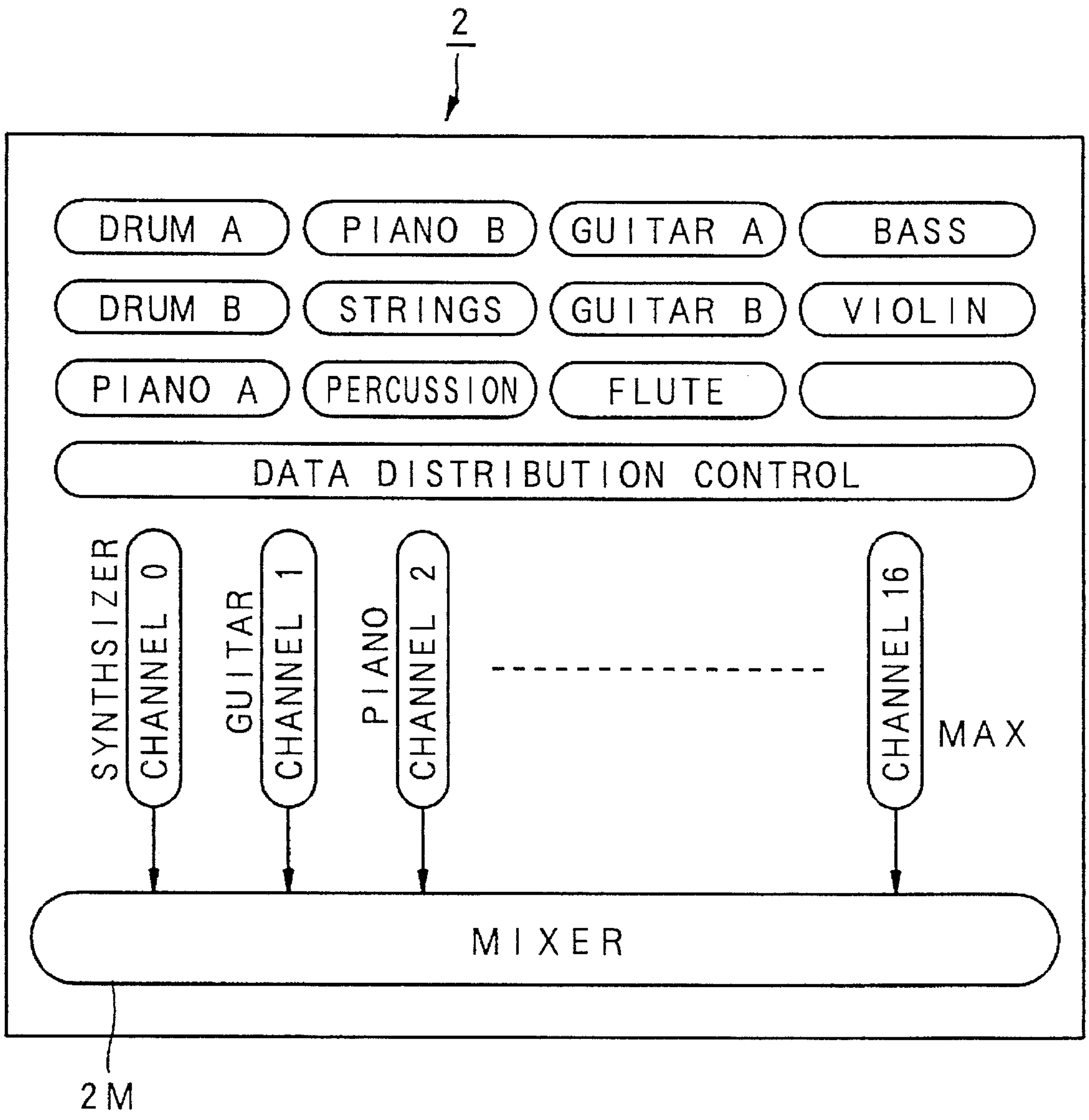
FIG. 5 is a diagram illustrating construction of MIDI sound source shown in FIG. 4.

FIG. 5 illustrates a construction of the MIDI sound source 2. The MIDI sound source has more than 200 kinds of tones, and sixteen kinds of tones, at maximum, out of them are designated as channels. Tones of each channels are mixed by mixer 2M to produce accompaniment music. Accompaniment music thus produced is mixed with voice of singer received by the microphone 6, and the mixed signal is amplified and output by the amplifier 4. For changing pitch of accompaniment music, singer instructs, via the instruction unit 7, pitch change information relating to direction (high or low) and amount of changes of pitch desired. Pitch change information is transmitted to the control unit 1 via the interface 9. The control unit 1 performs pitch change processing the details of which will be described later.

Figure 6:
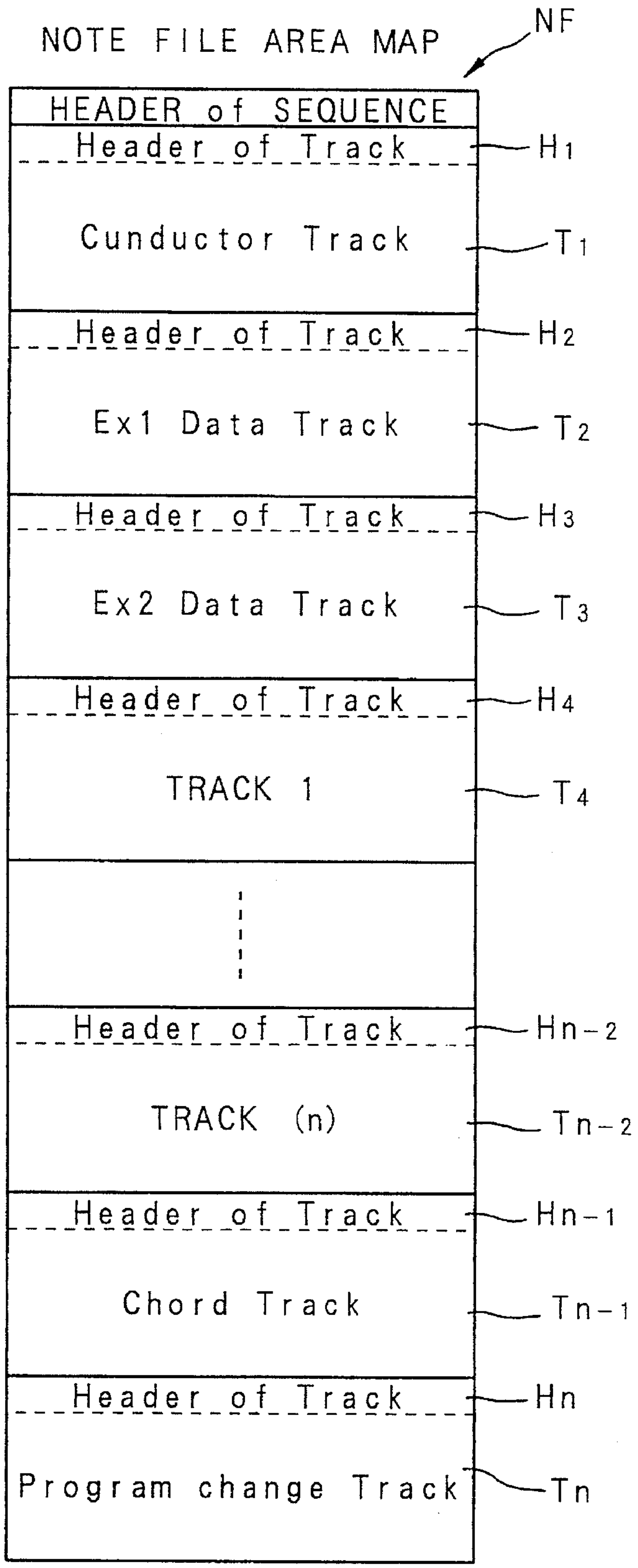
FIG. 6 is a diagram illustrating constitution of note-file serving as MIDI accompaniment information.

Next, MIDI accompaniment information reproduced by the MIDI karaoke apparatus will be described. MIDI accompaniment information is comprised of note file NF formed as shown in FIG. 6. Note file NF includes actual play data of format according to MIDI standard. Note file NF is comprised of a plurality of tracks ($T_1$–$T_n$) and track headers ($H_1$–$H_n$) corresponding to each of the tracks. Contents of each tracks are shown in FIG. 7. Note file NF includes various types of tracks including note tracks for storing MIDI sound source play data, conductor track for setting rhythm, tempo of music and control track for storing data used for various controls relating to music play. Note tracks for storing MIDI sound source play data are distributed into pitch variable tracks and pitch invariable tracks. When singer instructs pitch change, pitch of pitch variable track is changed, but pitch of pitch invariable track is not changed.

Figure 1A:
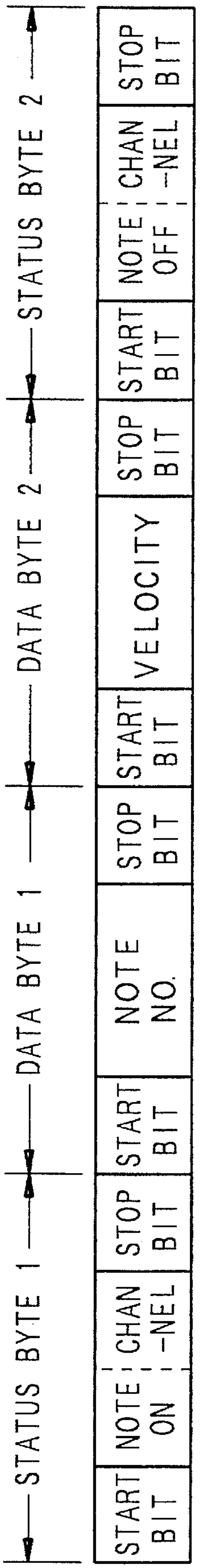
FIGS. 1A and 1B are diagrams illustrating data format of note-on/note-off messages.
Figure 1B:
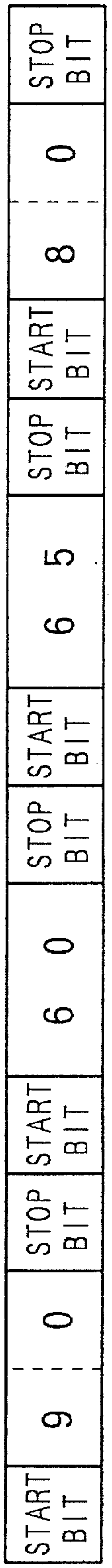
Figure 2:
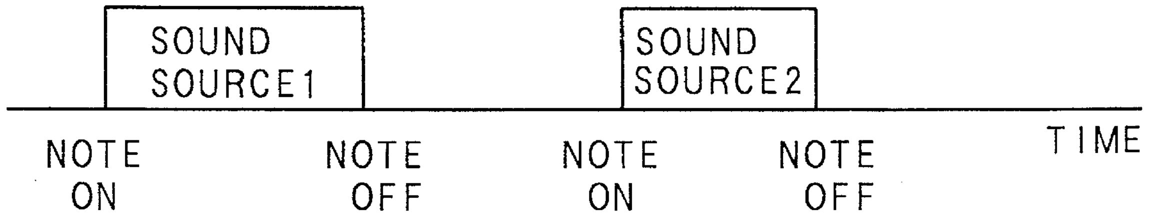
FIG. 2 is a schematic diagram illustrating note-on/note-off operation.
Figure 3:
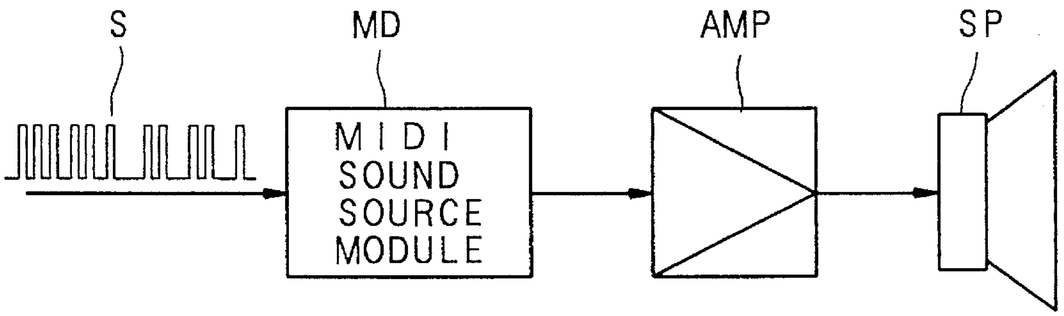
FIG. 3 is a schematic diagram illustrating manner of reproducing MIDI signal.

Data of pitch variable track is supplied to corresponding channel of pitch variable tones while data of pitch invariable track is supplied to corresponding channel of pitch invariable tones. Pitch variable track corresponds to tone whose pitch should be varied to adapt pitch of accompaniment music to user's key. For example, melody track and code track belong to pitch variable track. Pitch invariable track corresponds to tone whose pitch need not be changed regardless of pitch change instruction. For example, rhythm track for instruments with no pitch, such as drums, and track for sound effects belong to pitch invariable track. Track headers ($H_n$) corresponding to each of the tracks, shown in FIG. 3, store information for discriminating pitch variable track and pitch invariable track, respectively. The control unit 1 receives pitch change instruction from user, refers to track headers in note file NF, and executes pitch change processing only to pitch variable tracks. Although fourteen types of tracks are represented in the example of FIG. 7, various tracks of 128 types may be used at maximum. To the key control invariable track (No. 5), the above described sound effect may be assigned so that the pitch of sound effect is maintained invariable.

Next, actual pitch change processing will be described.

Figure 8:
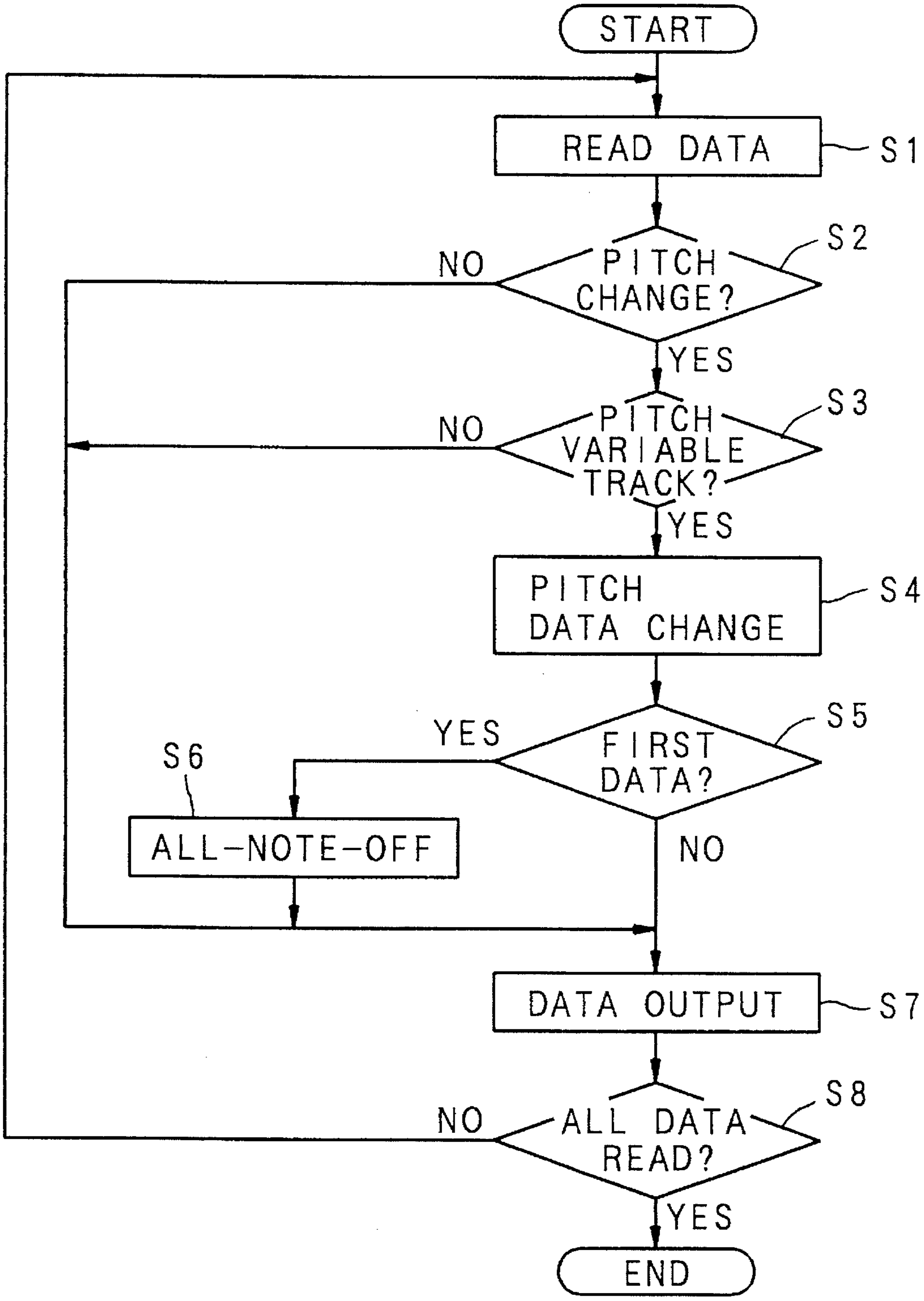
FIG. 8 is a flowchart illustrating first method of changing pitch.

Firstly, first pitch change processing executed by pitch control device of the invention will be described with reference to the flowchart of FIG. 8. At first, the control unit 1 reads out MIDI accompaniment data from the MIDI data storage unit 3 (step S1). Then, the control unit 1 discriminates whether pitch change instruction is input to the instruction unit 7 or not (step S2). If pitch change instruction is input, the control unit 1 discriminates, referring to note file of the MIDI accompaniment data, whether read-out data is data of pitch variable track or not (step S3). If it is data of pitch variable track, the control unit 1 changes note number of the data to produce pitch-changed data (step S4). Then, the control unit 1 discriminates whether the data is first data read out firstly after the pitch change instruction or not (step S5). If the data is first data, the control unit 1 issues all-note-off instruction (step S6). The "all-note-off" instruction is to execute note-off to all tones of designated channels. Namely, by issuing all-note-off instruction, sound generation of all channels are terminated. More concretely, by issuing data of [B0 7B], sound generation of all channels are terminated. After this, the control unit 1 transmits the pitch-changed data to the MIDI sound source 2 (step S7). Alternatively, if it is discriminated that the data is not first data in step S5, the data is transmitted to the MIDI sound source 2 as it is, i.e., without pitch change (step S7). If step S2 or step S3 results in NO, the process proceeds to step S7 and the read-out data is transmitted to the MIDI sound source 2 as it is. Then, the control unit 1 discriminates whether all data are read or not (step S8). If NO, the step returns to step S1 to read next data.

Figure 10:
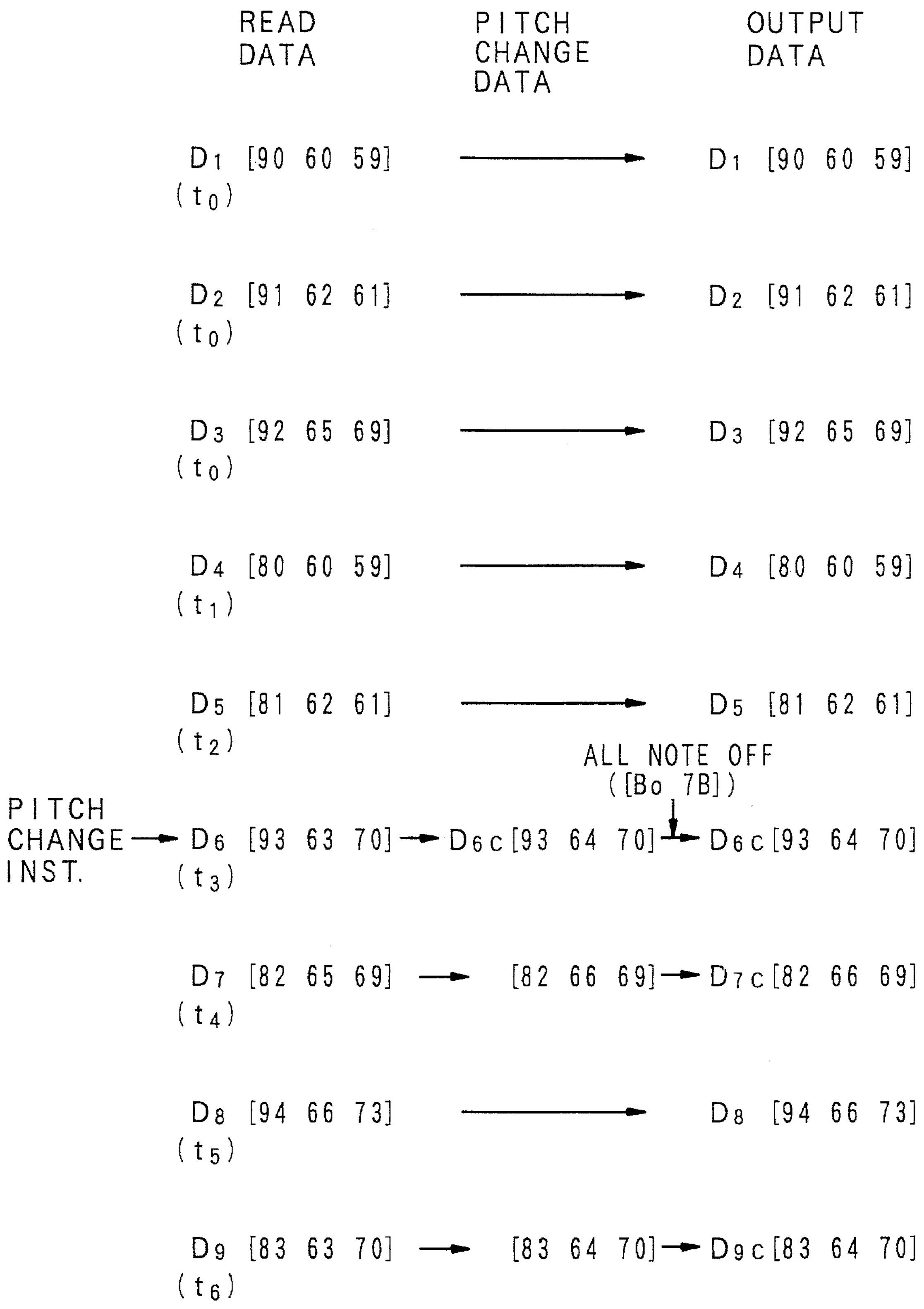
FIG. 10 is a diagram illustrating pitch change operation according to the first pitch changing method.

Next, concrete operation of pitch change processing will be described with reference to FIGS. 9–11. FIG. 9 shows an example of note file data NF serving as MIDI accompaniment data. It is noted that, as contents of each data $D_1$–$D_9$, only note-on/off, note number (pitch) and velocity (volume) data are illustrated for the sake of brevity. Further, it is assumed that each data $D_1$–$D_9$ have been read into the buffer 10 in advance and are output from the control unit 1 to the MIDI sound source 2 at timings $t_0$–$t_9$ represented in figures. Still further, it is assumed that singer inputs pitch change instruction to raise pitch one level (which corresponds to instruction of incrementing value of note number by one) at the time $t_3$. Still further, it is assumed that tone of MIDI equipments specified by the channels "0"–"4" shown in FIG. 9 are referred to as "TONE-0"–"TONE-4", and that "TONE-0", "TONE-2" and "TONE-3" are pitch variable tones while "TONE-1" and "TONE-4" are pitch invariable tones. FIG. 10 shows operation of pitch change processing by note file data, and FIG. 11 shows play manner of sound sources in time correspondence.

Pitch change processing under the above-described conditions will be described with reference to FIGS. 9–11. Firstly, data $D_1$–$D_3$ are read, and TONE-0 to TONE-2 are made note-on at time $t_0$, respectively. Then, data $D_4$ is read and TONE-0 is made note-off at time $t_1$. Namely, sound generation of TONE-0 is terminated at time $t_1$. Then, data $D_5$ is read and TONE-1 is made note-off at time $t_2$. Subsequently, data $D_6$ is read and at the same time pitch change instruction is input. Here, since TONE-3 corresponding to the data $D_6$ is pitch variable tone, note number of the read data $D_6$ is changed from "63" to "64", and pitch-changed data $D_{6C}$ is output after all-note-off is executed. In addition, TONE-2 which has been generated is made note-off due to the execution of all-note-off, and therefore sound generation of TONE-2 is terminated at time $t_3$. Subsequently, data $D_7$ is read and note number of TONE-2 is changed from "65" to "66" to produce pitch-changed data $D_{7C}$. However, since TONE-2 was made note-off at time $t_3$, no special performance appears due to the data $D_7$. Subsequently, data $D_8$ is read at time $t_5$. Since TONE-4 is pitch invariable tone, pitch of TONE-4 is not changed and data $D_8$ is output as it is read. As a result, TONE-4 is made note-on and corresponding sound is generated. Subsequently, data $D_9$ is read at time $t_6$. Since TONE-3 is pitch variable tone, note number "63" of data $D_9$ is changed to "64" and the pitch-changed data $D_{9C}$ is output. As a result, TONE-3 is made note-off at time $t_3$.

As described above, when pitch change instruction is input, the control unit 1 refers to information for identifying pitch variable track or pitch invariable track, stored in track headers of each tracks in note file, and executes pitch change processing onto only pitch variable tracks. Namely, pitches of only predetermined pitch variable tones are changed. Therefore, pitches of each sound are changed naturally. In addition, accompaniment music matches with singer's key and singer may easily and comfortably enjoy singing.

Figure 11:
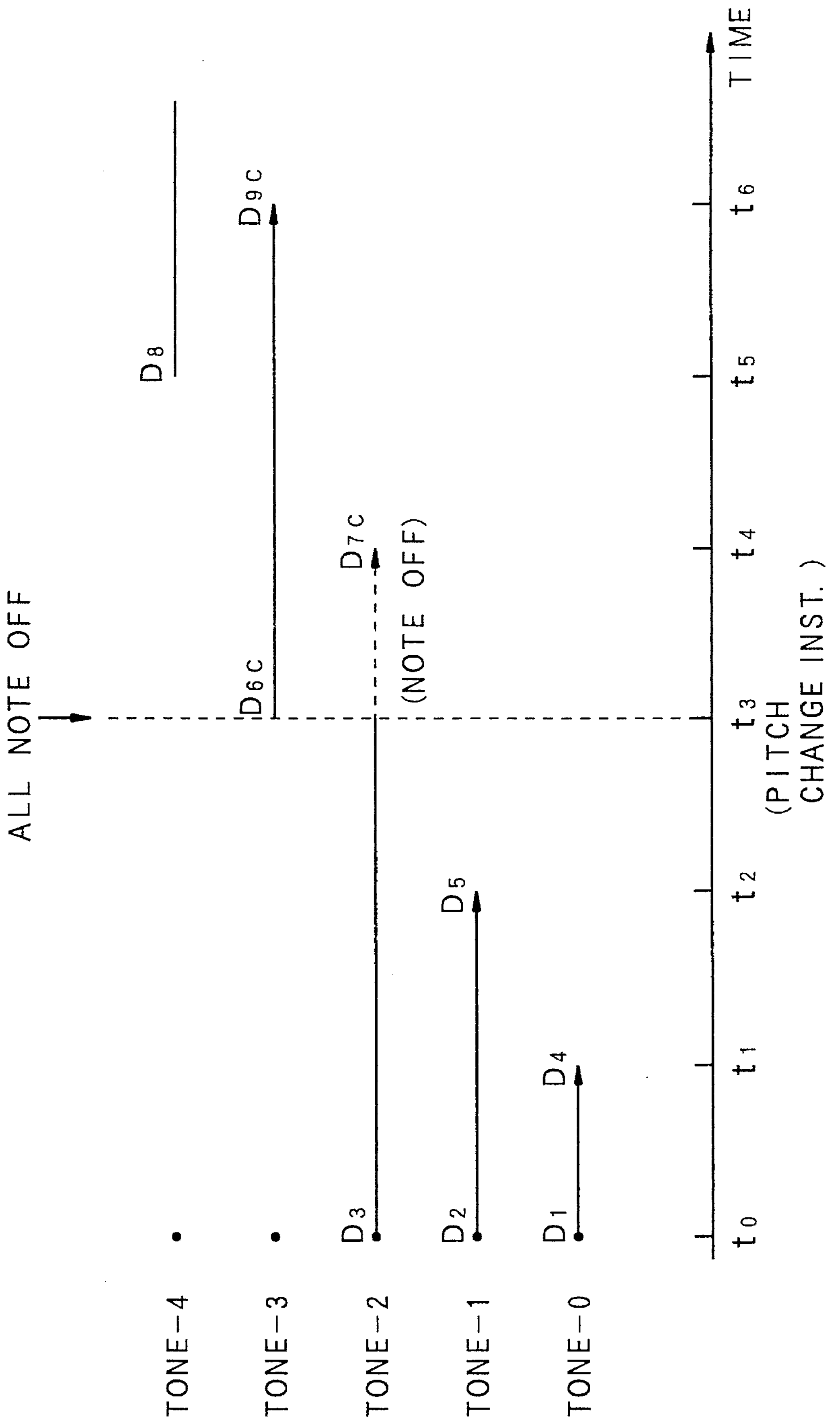
FIG. 11 is a diagram illustrating play condition of sound sources.

According to the above described pitch change method, all-note-off instruction is issued at the time of pitch change instruction and therefore sound generation from sound sources is terminated, as seen from FIG. 11. Namely, after pitch change instruction is input, number of sounds generated by sound sources are reduced. In consideration of this, in a method described below, note-on data of tones currently in note-on state are successively stored in the buffer 10 provided in the control unit 1.

Figure 12:
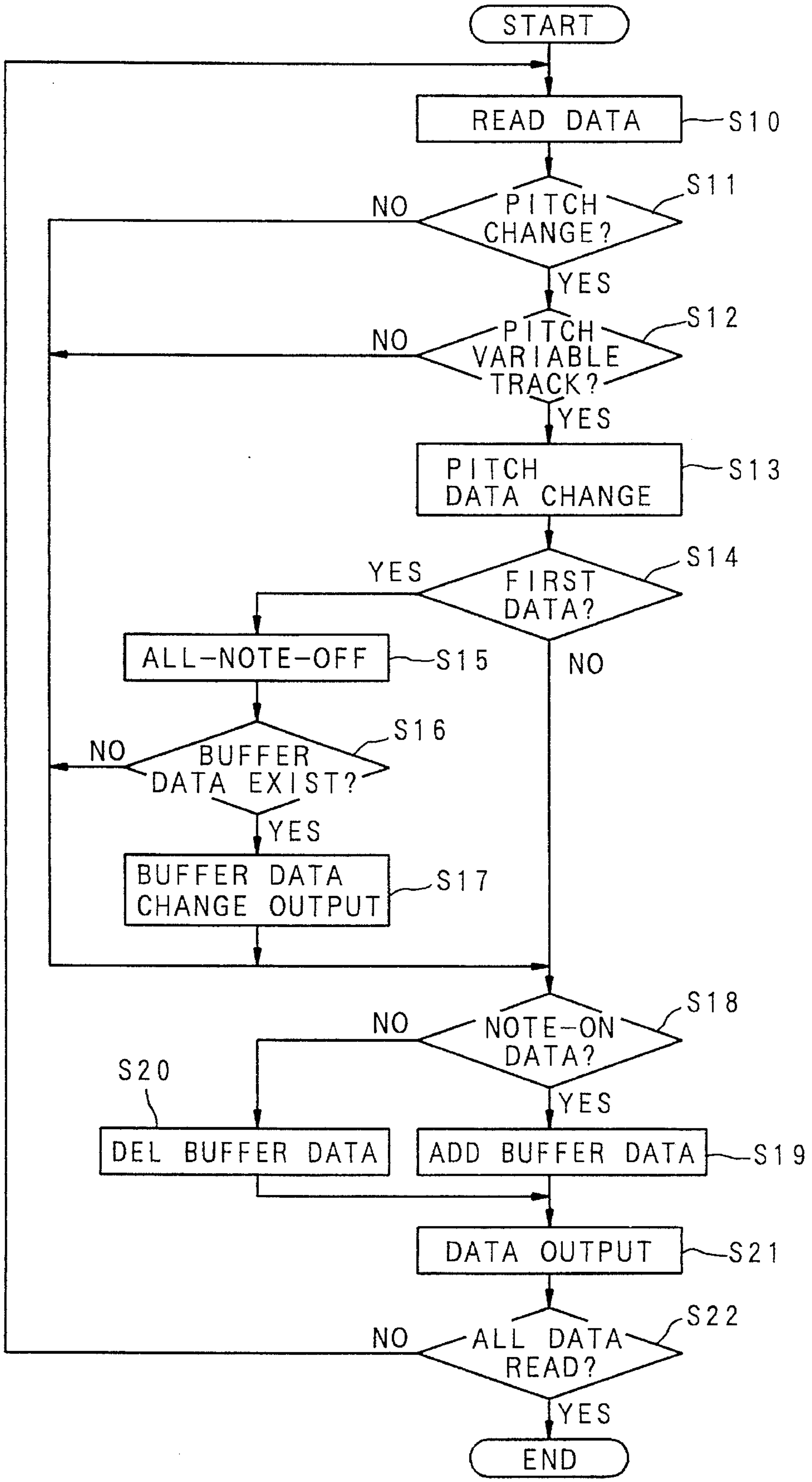
FIG. 12 is a flowchart illustrating second method of changing pitch.

Next, second pitch change processing executed by pitch control device of the invention will be described with reference to the flowchart of FIG. 12. At first, the control unit 1 reads out MIDI accompaniment data from the MIDI data storage unit 3 (step S10). Then, the control unit 1 discriminates whether pitch change instruction is input to the instruction unit 7 or not (step S11). If pitch change instruction is input, the control unit 1 discriminates, referring to note file of the MIDI accompaniment data, whether read-out data is data of pitch variable track or not (step S12). If it is data of pitch variable track, note number data is changed in accordance with the pitch change information (step S13). Then, the control unit 1 discriminates whether the data is first data read out firstly after the pitch change instruction or not, by comparing the data with data stored in the buffer 10 (step S14). If it is first data, the control unit 1 issues all-note-off instruction (step S15). Accordingly, at this moment all sound generations are terminated instantaneously. Subsequently, the control unit 1 refers to data stored in the buffer 10 and discriminates whether note-on data exists in the buffer 10 or not (step S16). If there exists note-on data in the buffer 10, the control unit 1 discriminates whether each of the note-on data stored in the buffer 10 is data of pitch variable track or pitch invariable track, and changes only note number of data of pitch variable tracks. Then, the control unit 1 outputs all note-on data stored in the buffer 10 (step S17). If steps S11, S12 or S16 results in No, the process proceeds to step S18. Then, the control unit 1 discriminates whether the data read is note-on data or not (step S18). If the data read is note-on data, the contents are stored in the buffer 10 (step S19). Alternatively, if the data is not note-on data, i.e., note-off data, note-on data relating to the tone stored in the buffer 10 is deleted (step S20). Accordingly, the buffer 10 always stores note-on data of sound which is currently in note-on state. Thereafter, the read data is output (step S21). Subsequently, the control unit 10 discriminates whether all data are read or not (step S22), and repeats the above processing until all data are read.

Figure 13:
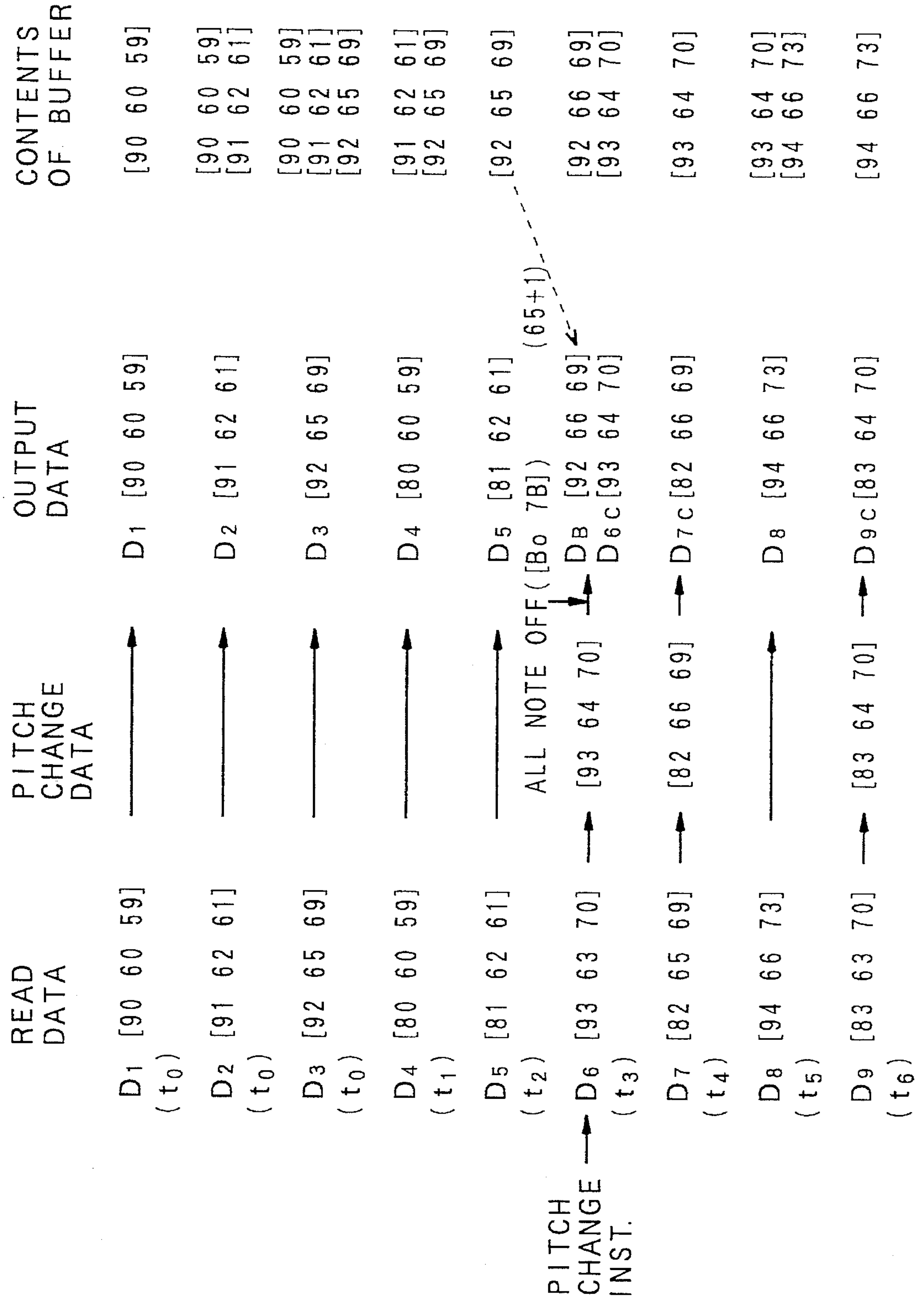
FIG. 13 is a diagram illustrating pitch change operation according to the second pitch changing method.
Figure 14:
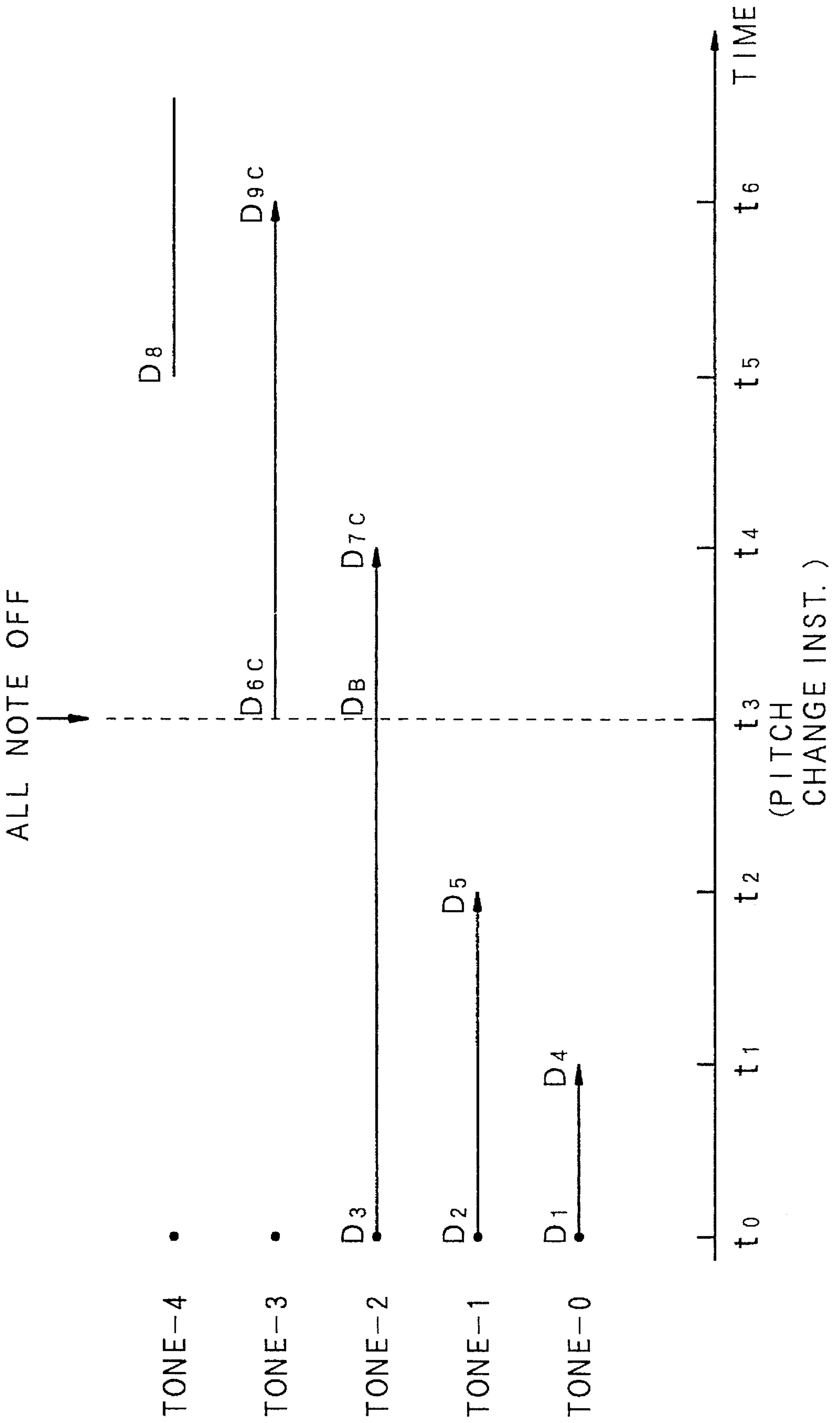
FIG. 14 is a diagram illustrating play condition of sound sources.

Next, concrete operation of pitch change processing will be described with reference to FIGS. 13–14. It is noted that the following description is directed to a case where the same successive data as the case of first method are input. In FIG. 13, the same processing as that of FIGS. 10–11 are executed until time $t_3$ of pitch change instruction. Accordingly, just before time $t_3$, only TONE-2 is in note-on state, and this data is stored in the buffer 10. When pitch change instruction is input at time $t_3$, pitch of the read data $D_6$ is changed and then all-note-off operation is executed. Subsequently, the control unit 1 refers to the buffer 10, and changes pitch of only pitch variable tones out of note-on data stored in the buffer 10. Here, at time $t_3$, note-on data [92 65 69] is stored in the buffer 10. Since TONE-2 is pitch variable tone, the control unit 1 changes the data to $D_B$ [92 66 69] in response to the pitch change instruction, transmits it to the MIDI sound source 2 together with the data $D_{6C}$ [93 64 70] changed in advance, and generates corresponding sound. Accordingly, pitch change is executed to TONE-2 which has already been generated at the time of pitch change instruction, and pitch-changed TONE-2 is successively generated thereafter. Processing after time $t_3$ is identical to that of the case shown in FIG. 10, and therefore brief description will be omitted.

The above description is directed to embodiments in which musical sound producing device of the invention is applied to karaoke apparatus, however, application of the present invention is not limited to karaoke apparatus. The present invention is applicable to various kind of musical play utilizing MIDI sound source.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A musical sound producing device for producing musical sound from MIDI data, comprising:

a MIDI sound source for producing musical sound from prepared MIDI data including play data for producing musical sound of plurality of tones, pitch data for designating pitch of the tones and pitch variable/invariable data indicating pitch variable tones and pitch invariable tones, said MIDI sound source producing musical sound of tones designated by the play data with pitch designated by the pitch data;

an instruction unit for receiving a pitch change information from a user; and a pitch change circuit for changing the pitch data of only pitch variable tones specified by the pitch variable/invariable data in accordance with the pitch change information.

2. A musical sound producing device according to claim 1, further comprising a storage unit for storing information indicating tones of musical sound being currently produced.

3. A musical sound producing device according to claim 1, wherein said play data comprise a plurality of data tracks indicating play data of the plurality of tones, and said pitch variable/invariable data indicate that each of the tones corresponding to the data tracks is pitch variable track or pitch invariable track.

4. A musical sound producing device according to claim 1, wherein the pitch change information is in a form of key or pitch.

5. A method of producing musical sound from MIDI data comprising the steps of:

preparing MIDI data including play data for producing musical sound of plurality of tones, pitch data for designating pitch of the tones and pitch variable/invariable data indicating pitch variable tones and pitch invariable tones;

receiving a pitch change information from a user;

changing the pitch data of only pitch variable tones specified by the pitch variable/invariable data in accordance with the pitch change information;

supplying the pitch data to MIDI sound source;

producing musical sound of tones designated by the play data with pitches designated by the pitch data; and outputting the musical sound from the MIDI sound source.

6. A method according to claim 5, further comprising the step of storing information indicating tones of musical sound being currently produced.

7. A method according to claim 5, wherein the pitch change information is in a form of key or pitch.

* * * * *